United States Patent Office

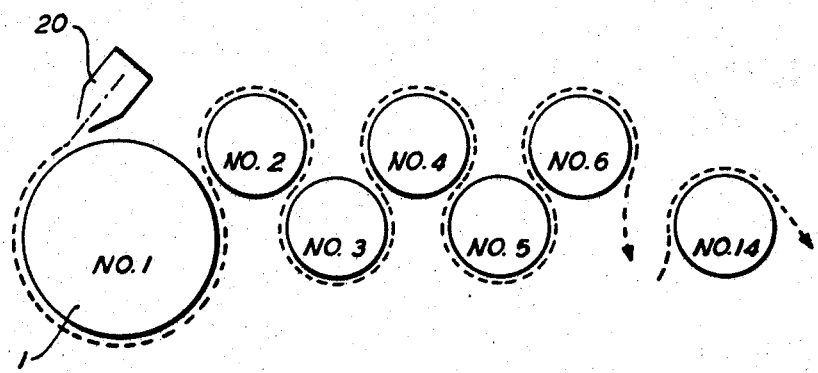

3,471,594
Patented Oct. 7, 1969

3,471,594
METHODS OF MANUFACTURING POLYVINYL ALCOHOL FILMS
Saburo Kawamura, Saijo, and Masaru Takata, Okayama, Japan, assignors to Kurashiki Rayon Co., Ltd., Kurashiki-shi, Okayama Prefecture, Japan, a corporation of Japan
Continuation of application Ser. No. 493,431, Oct. 6, 1965. This application July 25, 1966, Ser. No. 567,685
Claims priority, application Japan, Oct. 27, 1961, 36/38,854
Int. Cl. B29d 7/02, 7/24; B29c 25/00
U.S. Cl. 264—210
4 Claims

ABSTRACT OF THE DISCLOSURE

A method for producing transparent films from polyvinyl alcohol mixtures free of directional orientation, strain, and wrinkles wherein the material is extrusion casted, the resultant film is progressively stretched and gradually dried while controlling the water content of the film and thereafter subjected to a calendering or polishing operation.

---

This application is a continuation of our application Ser. No. 493,431, filed Oct. 6, 1965, which is a continuation-in-part of application Ser. No. 232,418, filed Oct. 23, 1962, both of which applications are abandoned.

This invention relates to methods of manufacturing polyvinyl alcohol films, and is more particularly concerned with methods that allow the efficient and consistent production of transparent films free of directional orientation, strain, and wrinkles.

In conventional methods of manufacturing thin films from thermoplastic materials, as polyvinyl chloride, polyethylene, and polypropylene, the material is continuously extruded through an annular die to form the thin film. However, it has been found that if one attempts to manufacture polyvinyl alcohol films by these conventional prior art methods, difficulties are encountered which make utilization of these conventional methods commercially impractical. One method that has been used to prepare polyvinyl alcohol films involves the melt casting of a polyvinyl alcohol film forming solution of relatively low density onto the surface of a rotating drum or endless metal bands. But this particular melt casting method has certain objectionable features; these include: (1) considerable drying time is required, (2) the film surface lacks uniformity, because of the presence of wrinkles and creases believed to be caused by previous heating of only one side of the extruded film resulting in the two exposed film surfaces having different water contents. Further, this melt casting method requires a special heat treating step to relieve unequal dry stresses and requires provision for humidity control. Because of these and other disadvantages, the melt casting method is not entirely satisfactory for large scale commercial production of polyvinyl alcohol films.

The present invention provides methods and procedures which are free of the objectionable features and disadvantages described above, and the methods of this invention are suitable for large scale commercial production of polyvinyl alcohol films. The methods of this invention allow the efficient production of transparent films free of directional orientation, strain, and wrinkles.

In accordance with the present invention the polyvinyl alcohol film forming material is extruded from a die to form a thin film; the resultant formed thin film having a water content in excess of 20% by weight is progressively stretched and gradually dried on heated rolls until the film contains the desired water content; the film is then subjected to a calendering or polishing operation; film elongation speed is about 1.2 to 5 times the film extrusion speed.

The attached drawing schematically illustrates typical apparatus which may be conveniently used in the practice of the methods and procedures of this invention.

The polyvinyl alcohol film forming resin materials useful in the procedures and methods of this invention include: fully and partially saponified polyvinyl alcohol, acetalized polyvinyl alcohol having a low degree of acetalization, urethanylated polyvinyl alcohol, oxyethylated polyvinyl alcohol, cyanoethylated polyvinyl alcohol, and sulfo-acetalized polyvinyl alcohol; and saponified vinyl acetate copolymers as the saponified copolymer of ethylene and vinyl acetate, the saponified copolymer of alkyl alcohol and vinyl acetate, the saponified copolymer of methylmethacrylate and vinyl acetate, and the saponified copolymer of methyl acrylate and vinyl acetate.

In the practice of the methods of this invention the polyvinyl alcohol film forming resin material is fed to and through a screw extrusion machine of conventional design. The material being extruded should contain less than 60% by weight of water. The resin may be in the form of flakes, chips or pellets and in some instances the resin may contain a specified amount of plasticizer or surface active agent, or both. If the water content of the resin in the extruding apparatus exceeds 60%, considerable difficulty is encountered in extruding the resin through the die head 20 and in stretching operations and in stripping from the drying rolls; which ultimately results in the production of films having an unsatisfactory surface. The molten resin is extruded at a temperature of between 50° C. and 160° C., and the resulting film is fed onto the surface of rotating roll 1 which is coated with a smooth resin or the resulting film is fed onto the surface of a highly polished stainless steel belt, with the temperature of the surface being maintained between about room temperature (23° C.) and 100° C. If the temperature of the resin material being extruded is less than 50° C., die pressure increases and extrusion from the die 20 is unsatisfactory and stretching thereafter becomes difficult. On the other hand, if the temperature of material being extruded exceeds 160° C., bubbles are formed which deleteriously affect the resulting film surface. The film emerging from the surface of the rotating roll referred to above, just prior to the drying operation, may have a water content as high as 42% without causing any slipping difficulty. The film is then dried and finished by rolls maintained at less than 100° C. so that there is no undesirable formation of bubbles in the thin film. Stretching of the film as described above, drastically reduces the time required for subsequent drying, and provides for efficient film production, and insures reproducibility of product characteristics.

The film passes over at least two smooth drying rolls which are driven at peripheral speed of about 1.2 to 5 times the film extrusion speed, until the water content is reduced to 20%. This step enables the production of a film which is characterized by the absence of stress concentrations. When the water content of film is less than 20% during stretching, directional orientation and strain result to produce an unsatisfactory commercial product.

The extruded film speed may be calculated in accordance with the following formula $$V \frac{W}{S} \times \frac{1}{D \times 10^{-2}} \times 10^{-2}$$

where W is the extrusion rate or the amount of material extruded per unit time, expressed in grams per minute; S is the specific gravity of extruded material; D is the cross-sectional area of the die opening, expressed in square millimeters; and V is the speed of extruded film, expressed in meters per minute.

To determine the effect of varying amounts of water in theresin during the course of film formation, the extruded film was stretched until the original length was doubled. The polyvinyl alcohol resin used had an average degree of polymerization of 1750 and a degree of saponification of 99.8 mol percent, a water content of about 56% by weight and a small amount of plasticizer. The table below illustrates how varying amounts of water affect (1) tensile strength of the film in either a longitudinal direction (direction of flow) or lateral direction, (2) its elasticity, and (3) its tear strength.

material being extruded is 6 to 7%, and 3 to 4% during the stretching and drying operations. Here stripping of film was not possible until the original water content of about 90% was reduced to 4%; and further, in order to produce a film, 0.02 mm. thick, the temperature of roll 1 (diameter of 600 mm.) had to be maintained below 100° C., and a lapse time of 60 seconds was required thereafter before stripping was possible. The speed of film formation on the surface of roll 1 was about 1.8 m. per minute; higher speed of film formation may be obtained with a continuous stainless steel belt.

In the present invention, however, the extruded material may contain 56% water, the film leaving roll 1 may contain 42% water, the temperature of roll 1 (diameter

| Amount of contained water when stretched, Percent | Direction | Unit tensile strength | | Elasticity | | Tear strength | |
|---|---|---|---|---|---|---|---|
| | | Kg./cm.² | Long./Lat. | Percent | Long./Lat. | g./mm. | Long./Lat. |
| 38.2 | Longitudinal/Lateral | 4.20/4.00 | 1.03 | 132/134 | 0.99 | 3,760/3,802 | 0.99 |
| 22.1 | Logitudinal/Lateral | 4.41/4.38 | 1.04 | 127/130 | 0.98 | 3,742/3,841 | 0.97 |
| 17.4 | Logitudinal/Lateral | 5.58/3.17 | 1.76 | 98/187 | 0.52 | 1,250/4,423 | 0.28 |
| 10.3 | Longitudinal/Lateral | 6.25/2.18 | 2.86 | 33/215 | 0.15 | 21/1,056 | 0.20 |

The above data clearly shows that at the time both surfaces of the extruded film are dried until the desired water content is obtained, smoothing, calendering or polishing of film may also take place simultaneously without detrimentally affecting the final film product. The surface of the drying rolls must be very smooth and have a high luster, in the order of 4 to 24 microinches, since condition of the roll surface affects the surface of film produced by the instant invention.

While the following examples will serve to illustrate the present invention more fully, they are not to be construed as limiting the scope of the invention.

EXAMPLE 1

To an aqueous solution of polyvinyl alcohol (average degree of polymerization 1700; degree of saponification 99.8 mol percent) having a water content of 56% by weight, there was added a plasticizer, and the solution was fed to a screw extruder at a rate of 416 grams per minute. The diameter of the screw was 3.5 inches. The material at 96° C. was extruded as a thin film from the die opening, at a pressure of 2 to 3 kg./cm.² and at a rate of 416 grams per minute through the opening of 1160 mm. in width and 0.1 mm. in clearance. The extruded film was passed over the surface of roll 1, 600 mm. in diameter and 1300 mm. in width, maintained at a temperature of 65° C. and driven at a peripheral speed which was about 1.2 times the extrusion speed. Referring to the attached drawing, the distance between the lip or extreme end of the die 20 and roll 1 may range from 1 to 3 mm. From roll 1, the film with a water content of 36% passed over rolls 2, 3 and 4, the speed of which rolls respectively is 1.8, 2.1, and 2.25 times the speed of extruded polymer. The thin film was thus elongated to 2.25 times its original length and dried to the point where its water content was 20%. Subsequently the film was passed over ten drying rolls, the temperature and speed of which were so adjusted that the film ultimately had a water content of 6%. The surfaces of the drying rolls were chrome-plated and smooth in the order of 8 to 12 microinches, and the clearance between each roll was 0.1 to 0.4 mm. The polyvinyl alcohol film produced may be from 0.02 to 0.08 mm. thick and 1070 mm. wide, free of directional orientation, strain, or wrinkles. The film had a tensile strength of 4.26 kg./mm.², 131% elongation, tear strength of 3620 g./mm. in the longitudinal direction and 3600 g./mm. in the lateral direction.

In the conventional casting methods of preparing film, the maximum permissible amount of water in the resinous 600 mm.) may be maintained at 65° C., so that the time required for drying is reduced to a mere 8 seconds to insure satisfactory stripping. The film-forming speed on the surface roll 1 may be 10.55 m. per minute, at least 5.86 times the speed employed in the conventional method described above.

In the conventional method described above, where the ultimate content of water at the time of stripping is 3 to 4%, elongation of film is commercially impractical since such action tends to increase the directional orientation of the film. In sharp contrast, in the present invention where the water content is about 42% at time of stripping, stretching of film is satisfactorily achieved until the water content is reduced to 20%. In terms of manufacturing efficiency, the instant invention is 7 to 29 times as efficient as the conventional casting method.

EXAMPLE 2

To an aqueous solution of polyvinyl alcohol (average degree of polymerization 500, degree of saponification 98.8 mol percent) there was added 10% urea. A plasticizer and surface active agent were then added to the resulting urethanylated polyvinyl alcohol chips, and the water content adjusted to 26%. The resulting solution was fed to a screw extruder apparatus at a rate of 404 grams per minute. The diameter of the screw being 3.5 in. diameter. The material was extruded as a thin film from a die opening, 1160 mm. in width and 0.1 mm. in clearance, at a temperature of 96° C., and at a rate of 404 grams per minute, and at a pressure of 9–10 kg./cm.². The extrudate was passed over roll 1, maintained at a temperature of 20° C. and driven at a speed of 3.41 m. per minute, or about 1.15 times the speed of extruding the polymer. The film was then passed over rolls 2 to 4, maintained at a surface temperature of 20 to 50° C., until the water content was reduced to 20%. The speed of rolls 2, 3 and 4 was respectively 1.95, 2.45 and 2.70 times the speed of extruded polymer. The film was then passed over drying rolls 5 to 14, maintained at a surface temperature of 60 to 80° C., and driven at a speed insufficient to stretch the film, until the water content was reduced to 5%. Smoothing and calendering of film occurred simultaneously with the drying thereof. The water-soluble film thus produced had a tear strength of 2000 g./mm. in both longitudinal and lateral directions. The film was 0.03 mm. thick and 1070 mm. in width, and free of directional orientation, strain, and wrinkles.

EXAMPLE 3

A copolymer of vinyl acetate and ethylene (28 mol percent) was prepared, and saponified to a degree of saponification of 98.6 mol percent. To the polymer were added 20% plasticizer and 20% water, each amount based on the weight of the saponified material. The material thus prepared was then extruded as a film through a die opening, 1160 mm. in width and 0.05 mm. in clearance. The extrudate was passed over roll 1 maintained at 60° C. and driven at a speed 2.0 times the speed of extrusion; and subsequently it was passed over rolls 2 to 14 for drying, smoothing and calendering. No attempt was made to stretch the film. The water-resistant film thus produced had a tear strength of 1200 g./mm. in both longitudinal and lateral directions; it was entirely free of directional orientation, and further characterized in having a surface that was very transparent and lustrous.

It will be understood that the invention is not limited to the specific examples described herein, but may be practiced in other ways without departing from the spirit and scope of the invention as defined in the following claims.

We claim:

1. A method of preparing polyvinyl alcohol films free of directional orientation, strain and wrinkles which comprises, preparing a heated extrusion mixture of a polyvinyl alcohol film forming resin material and water having a temperature of from about 50° C. to about 160° C., said extrusion mixture having a water content in excess of 20% and less than 60% by weight of said mixture, passing said heated extrusion mixture into and through an extrusion zone to form a thin film with greater than 20% water, passing said formed film onto a moving quenching surface maintained at a temperature of from room temperature to about 100° C., maintaining said formed film in contact with said quenching surface to provide a film emerging from said surface having water content in excess of 20% up to about 42% by weight, stretching and heating said emerging film while moving said film at a speed of about 1.2 to 5.0 times the film extrusion speed to elongate the film and reduce the water content to about 20% by weight, and thereafter, progressively drying said elongated film in the absence of further stretching to reduce the water content of said film to less than 20% by weight and provide a transparent, polyvinyl alcohol film free of directional orientation, strain and wrinkles.

2. A method according to claim 1, wherein said heated extrusion mixture contains in addition, a plasticizer and a surface active agent.

3. A method according to claim 1, wherein said heated extrusion mixture is maintained at a temperature of about 96° C., and where the water content of said mixture is up to about 56% by weight, and where said quenching surface is maintained at a temperature of about 65° C., and where said film emerging from said surface has a water content of about 36% by weight prior to said stretching.

4. A method of preparing polyvinyl alcohol films free of directional orientation, strain and wrinkles which comprises, preparing a heated extrusion mixture of a polyvinyl alcohol film forming resin material and water having a temperature of from about 50° C. to about 160° C., said extrusion mixture having a water content in excess of 20% and less than 60% by weight of said mixture, passing said heated extrusion mixture into and through an extrusion zone to form a thin film with greater than 20% water, passing said formed film onto the surface of a rotating roll, said rotating roll having a surface temperature of from room temperature to about 100° C., and a peripheral speed of about 1.2 times the film extrusion speed from said extrusion zone, maintaining said formed film in contact with said rotating roll surface to provide a film emerging from said surface having water content in excess of 20% up to 42% by weight, passing said emerging film over additional rotating rolls having a peripheral speed of about 1.2 to 5.0 times said film extrusion speed to elongate the film and reduce the water content to about 20% by weight, and thereafter, progressively drying said elongated film in the absence of further elongation by passing said elongated film over further drying and smoothing rolls to reduce the water content of said film to less than 20% by weight and provide a transparent, polyvinyl alcohol film free of directional orientation, strain and wrinkles.

References Cited

UNITED STATES PATENTS

| 2,447,140 | 8/1948 | Shelton | 264—290 |
| 2,239,718 | 4/1941 | Izzard | 264—216 |

FOREIGN PATENTS 382,307  10/1963  Japan.

OTHER REFERENCES

The New Fibers, Sherman and Sherman, 1946, p. 7.

ROBERT F. WHITE, Primary Examiner

J. R. THURLOW, Assistant Examiner

U.S. Cl. X.R.

264—211, 216, 288, 345

PO-1050
(5/69)

UNITED STATES PATENT OFFICE
CERTIFICATE OF CORRECTION

Patent No. 3,471,594         Dated  October 7, 1969

Inventor(s)  Saburo Kawamura and Masaru Takata

It is certified that error appears in the above-identified patent and that said Letters Patent are hereby corrected as shown below:

Col. 2, the formula following line 65, should read $$V = \frac{W}{S} \times \frac{1}{D \times 10^{-2}} \times 10^{-2}$$

Col. 6, line 26, insert -- a -- before "water".

Col. 6, under Foreign Patents, "382,307" should read -- 38-23037 --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents